UNITED STATES PATENT OFFICE.

JOSEPH C. TUCKER, OF NEW YORK, N. Y.

IMPROVEMENT IN DEFECATING AND DEODORIZING SACCHARINE JUICES.

Specification forming part of Letters Patent No. 27,321, dated February 28, 1860.

*To all whom it may concern:*

Be it known that I, JOSEPH C. TUCKER, of the city of New York, in the county and State of New York, have invented certain new and useful Improvements in Defecating or Decolorizing Sugars or Saccharine Liquids; and I hereby declare the following to be a full, clear, and exact description of the same.

The manufacture and refining of sugars as generally practiced involves the use of blood, together with certain chemicals, which, while they are a source of deterioration of sugar are also very expensive, besides rendering the manufacture tedious, offensive, and unhealthy. Another method has been suggested, and patented on the 12th day of October, 1858, to Messrs. Tucker and Lanszweert, which proposes to obviate the employment of the objectionable defecating and decolorizing agents above referred to by the use of hydrate of alumina, obtained by dissolving bisulphate in its weight of pure water at a temperature of 60° Fahrenheit, and by precipitating that solution by adding gradually a solution of carbonate of soda. This precipitate, which is hydrate of alumina, although a vigorous defecating or decolorizing agent when used in its moist condition, has never been successfully employed in the manufacture of sugar on account of the great expense attending its preparation. The cost of the carbonate of soda and of the bisulphate of alumina on the one hand and the repeated washings required to free the product from the sulphate of soda that remains incorporated with it preclude its introduction in the refining of sugar.

My present invention has for its object and relates to the production of hydrated alumina to be used for defecating or decolorizing sugars and vegetable juices, whereby the same is obtained in a more expeditious and economical manner, and without imparting to it such properties as will act perniciously upon or deteriorate the quality of sugar.

In order to enable others to make and use my said improvements, I shall now proceed to describe it.

I take a weak aqueous solution of alum of commerce or of sulphate of alumina, as prepared in any known manner, and carefully neutralize the said solution by means of cream of lime. I use shell-lime in preference to stone-lime for the reason that the former is stronger and free from iron. Hydrate of alumina is thus formed, and is precipitated together with the gypsum, while such sulphate of lime as remains in solution is easily drawn off, leaving the said precipitate of alumina and gypsum behind. This precipitate is then agitated in fresh water and permitted to rest, when, the greater specific gravity of the gypsum carrying it first to the bottom, a clear and decided line of division is created between it and the hydrate of alumina, more slowly settling above. Of these mechanical separation is easily effected by gently drawing off the water containing the hydrated alumina in suspension. Fresh water may be added to the residuum, so that any hydrate of alumina remaining with the gypsum may be detached by subsequent washing and settling.

By these means I am enabled completely to separate the gypsum from the hydrated alumina, which is a very important feature of my improvement, since the presence of gypsum is a source of much injury to the after process of refining, and has actually prevented the use of lime in making hydrate of alumina as a defecating or decolorizing agent in the refining of sugar.

The hydrate of alumina obtained in the manner above described is used in its moist condition (the same consisting of about fifty parts of alumina and of about fifty parts of water) in a similar manner to that described in the patent of Tucker and Lanszweert, above referred to. Being insoluble, the alumina may be reclaimed after use, either by fermentation or by any other known method which would free it from organic impurities, and can be thus used over and over again.

In conclusion I would remark that the hydrated alumina as prepared by the process hereinbefore described may be used in the refining of sugar either with or without animal charcoal.

Having thus fully described my improvements, I would state my claims as follows:

1. The application, in the refining of sugar or saccharine liquids for decolorizing or defecating the same, of hydrated alumina, when the same is prepared by decomposing a solution of sulphate of alumina by means of cream of lime, as set forth herein.

2. In combination with the foregoing, the method herein described of separating gypsum from the hydrated alumina by agitating the same with water and allowing the former to subside, and by drawing off the supernatant hydrate of alumina, substantially as set forth.

In testimony whereof I have signed my name to this specification before two subscribing witnesses.

J. C. TUCKER.

Witnesses:
A. POLLOK,
EDM. F. BROWN.